United States Patent Office 2,945,844
Patented July 19, 1960

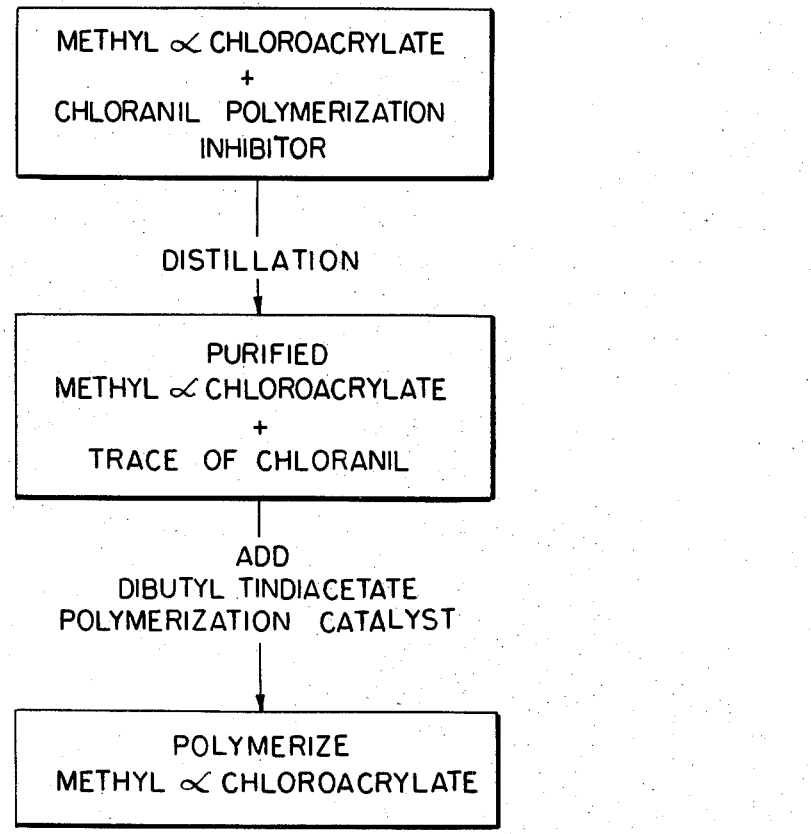
INVENTOR.
Harry D. Anspon

2,945,844

PROCESS FOR INHIBITING THE POLYMERIZATION OF α-CHLORACRYLATE ESTERS AND THE RESULTANT COMPOSITIONS

Harry D. Anspon, Easton, Pa., assignor to General Aniline & Film Corporation, New York, N.Y., a corporation of Delaware Filed Mar. 29, 1957, Ser. No. 649,305

1 Claim. (Cl. 260—86.1)

This invention relates to improvements in the manufacture, processing and treatment of polymerizable unsaturated halogen-containing organic compounds and in particular, to α-chloracrylic acid esters and derivatives thereof. Specifically, this invention relates to improvements whereby the handling of such monomeric materials is facilitated during processing and treatments thereof involving the application of heat and other polymerization aids.

The esters of α-chloracrylic acid, and particularly the lower alkyl esters such as methyl, ethyl, propyl, isopropyl, butyl and the like have become increasingly important base materials useful in the manufacture of polymers, which polymers are possessed of outstanding, unusual and unexpected properties. Among the various properties of such polymeric materials are those outstanding physical properties of high heat distortion temperature, high flexural and tensile strength, excellent craze resistance, low notch sensitivity, unique self-extinguishing characteristics in burning tests and complete formability which make these polymers particularly suited for use as a glazing material, especially for the glazing of high-speed aircraft. Among the well known chemical properties of the monomers from which these polymeric materials are prepared is the extreme sensitivity and reactivity of the highly purified monomer to polymerization. In order to prepare a polymer suitable for use as a glazing material and which will be characterized by the above described advantageous physical properties and, in addition, have the desirable and absolutely necessary optical characteristics, it has been discovered that the monomer, before it is subjected to polymerizing conditions to form the final product, must be in an exceptional state of purity otherwise one or several of the above described physical characteristics will suffer thereby. In addition, if the monomer is not handled with the utmost care, and if purification is not carried out to the utmost degree, there will arise in the final shaped polymer, or in the polymer subjected to deforming operations in the making of glazing materials such as canopies and the like, the formation of undesirable color bodies or undesirable bubble formation. It is thus of paramount importance to conduct the preparation of the monomer under the most stringent of conditions in order to successfully attain and achieve the utmost in desirable physical and chemical properties in the final polymer.

In carrying out the necessary processing involving purification of the various monomers contemplated, such techniques as distillations are necessary. These distillations involve, under the most desirable conditions, the application of considerable quantities of heat to the monomer in order to effect the necessary separation of impurities from the monomer. These necessary distillation steps, even when carried out at relatively low temperatures where the "pot" temperature is of the order of 50° C., result in rather large losses of the initial charge due to the premature polymerization of the monomer in the pot. In the absence of any polymerization inhibitor, such losses may amount to 100% of the total charge, or in other words, processing in the absence of any inhibitor is completely worthless and well-nigh impossible if it is desired to obtain pure distilled monomer. With many of the well known inhibitors heretofore employed with vinyl type or ethylenically unsaturated monomers such as hydroquinone, p-tertiary butylcatechol and the like, the results are somewhat improved but not sufficiently to render the processes economically feasible. Thus, with tertiary butyl catechol, losses are of the order of 25 to 50% in the pot. Hydroquinone, on the other hand, while a fair inhibitor, contaminates the distilled monomer to the point where, in subsequent polymerization reactions, undesirable color formation occurs. In addition, this particular inhibitor, present as a contaminant, prevents good control of the subsequent polymerization process with many of the desirable polymerization catalysts.

I have discovered that it is possible to process and purify monomers of α-chloroacrylic acid esters employing distillation techniques involving the application of heat to the monomer and at the same time, avoiding any premature polymerization thereof in the pot. In addition, I have discovered that it is possible to obtain an excellently purified monomer product in high yields devoid of any polymerization inhibitor contaminants, thereby insuring the successful attainment of a shaped polymer therefrom in subsequent polymerization processes.

It is therefore an object of my invention to provide a new process whereby monomers of α-chloracrylic acid esters may be processed and handled without premature polymerization thereof.

It is a further object of my invention to provide a process whereby highly purified monomeric acid esters may be prepared devoid of contaminants which interfere with subsequent polymerization thereof.

It is still another object of my invention to provide processes for the distillation of α-chloracrylic acid esters employing heat whereby pot losses due to premature polymerization are minimized.

It is still another object of my invention to provide compositions comprising monomeric esters of α-chloracrylic acid which exhibit outstanding stability towards polymerization.

It is another object of this invention to provide compositions comprising monomeric esters of α-chloroacrylic acid which exhibit outstanding and unusual stability against polymerization while under the influence of elevated temperatures.

It is a still further object of this invention to provide compositions comprising monomeric esters of α-chloracrylic acid which exhibit outstanding and unusual stability against polymerization while under the influence of heat radiation.

Other objects will appear hereinafter as the description proceeds. The objects of this invention are achieved by incorporating into the monomeric α-chloracrylic acid ester, chloranil. The amount of this compound to be incorporated will, of course, vary, and is not critical, but it has been found that amounts from about 0.001% up to about 1% thereof based on the weight of the monomer provide adequate protection to the monomer under the conditions hereinafter to be described.

It is indeed surprising that chloranil, while previously known as a polymerization inhibitor for vinyl compounds, was not considered satisfactory in distillation purification processes due to the excessive volatility thereof and the resultant low yields of distilled monomer. With the chloracrylate monomers contemplated in this invention, the use of chloranil in fractional distillation purifications gives a recovery better than 95% of the still charge. In addition, it is surprising that chloranil, because of its volatility, and therefore presence in the distilled monomer, does not adversely affect subsequent polymerization procedures as is the case with, for example, hydroquinone. The latter compound, when present in the distilled monomer, prevents polymerization with organic catalysts such as dibutyl tin diacetate as the polymerization catalyst, whereas chloranil has absolutely no such undesirable effect. This is an extremely important consideration because dibutyl tin diacetate is one of the best catalysts for use in sheet casting polymerization processes with chloracrylate ester compounds. The advantages of this catalyst are more fully described in U.S. Patent 2,683,705.

The accompanying drawing, comprising a flow sheet of the process hereinafter described will assist in an understanding thereof.

In order to determine the efficiency of polymerization inhibitors and make a comparison among the various compounds tested for such inhibition characteristics, the following test procedure was employed. Methyl chloracrylate which had been previously vacuum distilled under pre-purified nitrogen and which possessed a freezing point of −36.26° C. was poured into 20 mm. outside diameter test tubes on which had been sealed 10 mm. outside diameter necks. These necks were attached to a 2 in. length of polyvinyl alcohol tubing which could be sealed off with a pinch clamp. The test tube had previously been coated with a solution of polyvinyl alcohol and Congo red. This solution, on drying, deposited a red film over the glass through which observation of the contents of the tube could be made, but which would filter out light of the wave lengths responsible for polymerization. Each of these tubes holds approximately 33 ml. of monomer when filled up to the neck at the point where the polyvinyl alcohol tubing is attached. The compounds to be tested for inhibiting characteristics are weighed into each tube prior to the addition of the monomer and each tube swept with pre-purified nitrogen. After adding the monomer to the tube, the polyvinyl alcohol tubing is pinched shut so that no air may contact the liquid monomer present below the pinch clamp. The tubes are then sealed off and placed on a large mixing wheel which rotates at 3 revolutions per minute. The following heating cycle is employed in the test procedure:

4 days at 20–25° C.
5 hrs. at 50° C.
10 days at 20–25° C.
19 hrs. at 35–40° C.
3 days at 45–50° C.
5 days at 55–60° C.
Remainder of time at 65–70° C.

Each of the tubes on the mixing wheel is observed to determine the time required to gel or to form a nonflowing polymer in the tube while rotating at 3 revolutions per minute. Employing the above described testing procedure, the following materials were used for each 33 ml. of methyl α-chloracrylate monomer:

0.04 g. 1,5-diamino anthraquinone
0.04 g. 1-amino-4-hydroxy anthraquinone
0.04 g. thiourea
0.04 g. copper powder
0.04 g. phenol
0.04 g. p-tertiary butyl catechol
0.04 g. sulfur The pure monomer with no added inhibitor was found to require 28 days to gel in the above described test procedure. The monomer containing copper powder gelled in 3 days 4 hrs., that containing the 1,5-diamino anthraquinone in 10 days, that containing the 1-amino-4-hydroxy anthraquinone in 18 days, with thiourea 20 days and with phenol 27 days. Each of these materials, thus, it will be observed, while heretofore described as vinyl type polymerization inhibitors, actually, with the monomers contemplated in this invention, instead of being inhibitors of the polymerization reaction, appeared to catalyze it. The p-tertiary butylcatechol, on the other hand, and sulfur gave somewhat better results, the former requiring 32 days and the latter 28 days. The same procedure employing 0.04 g. of chloranil did not produce any gel of the monomer after 147 days, clearly indicating the vastly superior and unexpected inhibiting characteristics of this particular compound with the monomers with which this invention is concerned. The following examples will serve, further, to illustrate the vastly superior benefits to be derived from the use of the inhibitor above described.

Example 1

A charge of 1000 ml. of methyl-α-chloracrylate and 12.0 g. of chloranil having a freezing point of −37.25° C. is placed in a flask provided with a distillation column. The entire system is swept and maintained under nitrogen. The charge is then refluxed to effect a purification by distillation under a high vacuum of 30 mm. of mercury. The temperature of the pot throughout the distillation ranges from about 59 to 62° C. The reflux time is 12 hrs. The recovery of purified methyl-α-chloracrylate is 963 ml. The product has a freezing point of −36.60° C. and represents a product having a purity of better than 99.5%.

Example 2

The procedure of Example 1 is repeated except that the inhibitor employed is tertiary butylcatechol in the same amounts. Only 523 mls. of monomer are recovered having a freezing point of −37.00° C.

Example 3

The procedure of Example 1 is repeated employing, however, only 1.2 g. of chloranil and, additionally, 1.2 g. of 1,4,5,8-tetrahydroxy leuco anthraquinone. The recovery of purified monomer is 969 mls. and it has a freezing point of −36.58° C.

Example 4

The procedure of Example 1 is again repeated using, however, as the inhibitors 1.6 g. of chloranil and 10.0 g. of copper oxide (CuO). This process results in a recovery of 961 ml. of purified monomer which has a freezing point of −36.61° C.

Example 5

The distilled and purified product obtained by the process of Example 1 and which contains traces of inhibitor is subjected to polymerization in a mold having glass plates spaced 0.496 in. apart so as to yield a final polymer sheet of 0.375 in. in thickness. To the monomer batch there is also added as a catalyst 0.05% dibutyl tin diacetate. The mold, after filling with the liquid monomer and catalyst, is subjected to polymerizing conditions which are, expose at room temperature for 25 hrs. followed by exposure in an air oven for 4 hrs. at 60° C., followed by a heating cycle of 3 hrs. at 140° C. The resultant polymer sheet is characterized by satisfactory color, light and heat stability and surface characteristics. The same procedure carried out with freshly distilled monomer containing no trace of any inhibitor whatsoever (for example, distilled from a complete non-volatile type inhibitor such as disclosed in copending application Serial No. 649,326 (EE–1189A) filed March 29, 1957), now Patent No. 2,882,207, yields a product of substantially identical characteristics as when the chloranil is present in the monomer during polymerization, thus clearly indicating that this inhibitor does not deleteriously affect the dibutyl tin diacetate catalyzed polymerization reaction.

Variations and modifications which will be obvious and apparent to those skilled in the art may be made in the procedure above described without departing from the scope and spirit of my invention.

I claim:

A process which comprises distilling methyl α-chloracrylate containing from about 0.001% to about 1% by weight based on the weight of the methyl α-chloracrylate of chloranil and thereafter polymerizing the distillate containing chloranil with a polymerization catalyst of dibutyl tin diacetate.

References Cited in the file of this patent

UNITED STATES PATENTS

| | | |
|---|---|---|
| 2,233,835 | Crawford et al. | Mar. 4, 1941 |
| 2,241,770 | Dreisbach et al. | May 13, 1941 |
| 2,388,041 | Craig | Oct. 30, 1945 |
| 2,397,653 | Erickson | Apr. 2, 1946 |
| 2,399,340 | Franz | Apr. 30, 1946 |
| 2,407,861 | Wolk | Sept. 17, 1946 |
| 2,466,501 | Steadman | Apr. 5, 1949 |
| 2,476,528 | Barnes | July 19, 1949 |
| 2,683,705 | Anspon et al. | July 13, 1954 |
| 2,694,726 | Anspon | Nov. 16, 1954 |
| 2,704,770 | Anspon | Mar. 22, 1955 |

FOREIGN PATENTS

| | | |
|---|---|---|
| 528,761 | Great Britain | Nov. 6, 1940 |
| 750,358 | Great Britain | June 13, 1956 |

OTHER REFERENCES

Chem. Abstracts, 40:4036[4], May-August 1946.

Kice, J. L.: "J.A.C.S.," vol. 76, December 20, 1954, pages 6275–76.

Kice, J. L.: Journal of Polymer Science, vol. XIX, pages 123 and 126, 1956.